No. 881,050.　　　　　　　　　　　　　　　　PATENTED MAR. 3, 1908.
R. C. BLEAN & F. B. CANODE.
COOKING UTENSIL.
APPLICATION FILED APR. 25, 1907.
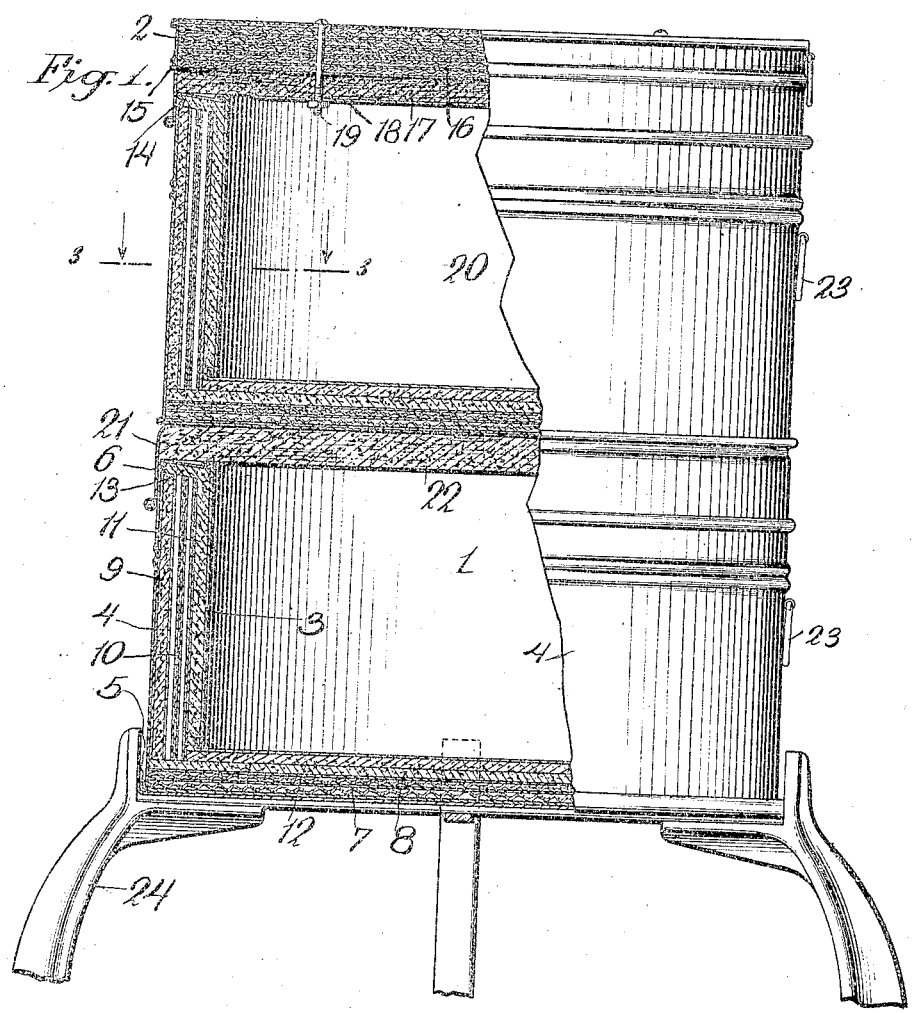
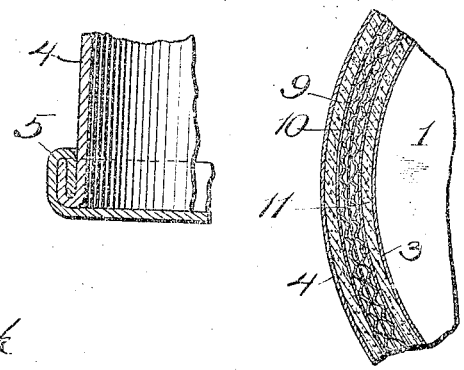
WITNESSES:
INVENTORS
Robert C. Blean
Frederic B. Canode
BY
　　　　ATTORNEY

UNITED STATES PATENT OFFICE.

ROBERT C. BLEAN AND FREDERICK B. CANODE, OF CHICAGO, ILLINOIS; SAID BLEAN ASSIGNOR TO SAID CANODE.

COOKING UTENSIL.

No. 881,050.  Specification of Letters Patent.  Patented March 3, 1908.

Application filed April 25, 1907. Serial No. 370,284.

*To all whom it may concern:*

Be it known that we, ROBERT C. BLEAN and FREDERICK B. CANODE, citizens of the United States, residing at Chicago, in the county of Cook and State of Illinois, have invented a certain new and useful Improvement in Cooking Utensils, of which the following is a specification.

This invention relates to cooking utensils and has reference more particularly to utensils of the type having heat-insulating material in the walls thereof to prevent, to as large an extent as possible, radiation of heat from a cooked or partially cooked substance confined within the utensil.

The object of the invention is to provide a cooking utensil of this type which is of an improved construction with respect to sanitary considerations and convenience in handling, which is highly efficient in retaining the heat of a partially cooked substance, and which is of pleasing appearance.

In accordance with the invention, the utensil consists of a suitably shaped receptacle having a removable cover which fits tightly thereon. The receptacle has a double wall and in the space between these walls is a material which is highly efficient as a non-conductor of heat. For this purpose we employ asbestos board, a sheet being preferably laid against each of the walls of the receptacle. The entire space between the two walls is not, however, filled with asbestos, as we have found that superior results are obtained by providing for dead-air spaces or cells between the double walls of the receptacle, since air conducts heat by radiation very poorly. The cover of the utensil is similarly insulated against the radiation of heat therethrough, though for this purpose we may employ heavy felt. For convenience in storing the receptacles after the partially cooked substances have been placed in them, we provide a supporting stand and so construct the receptacles that they can be laid one upon another and telescope somewhat so as to be self-sustaining.

The preferred embodiment of our invention is illustrated in the accompanying drawings, in which Figure 1 is a sectional elevation of two of the utensils and a portion of the supporting stand therefor, and Figs. 2 and 3 are sectional detail views, the section line of Fig. 3 being the line 3—3 of Fig. 1.

Referring to these drawings, the individual utensil consists of a receptacle 1 and a cover 2. The receptacle has an inner wall 3 and an outer wall 4, each consisting of a cylindrical side and a circular bottom joined at their edges in any suitable manner, as by a lap-and-fold joint 5, as shown. At the upper edge of the wall 3, an outwardly extending flange 6 is provided, either integral with or secured to wall 3, its edge overlying and being secured to the upper edge of the outer wall 4 so as to provide an air-tight space between the two walls. In this space are layers of heat-insulating material and dead-air cells. Preferably asbestos board is employed for this purpose and provision for the air cells is made by corrugating some or all of the layers of asbestos. Thus, 7 indicates a plurality of circular pieces of asbestos board lying upon the bottom of the outer wall 4 and corrugated so as to provide air spaces and over this is a similar layer 8 of heavy asbestos board which is not corrugated. A strip 9 of asbestos similar to strip 8 is laid against the outer wall 4 of the receptacle and next to it are a plurality of layers 10 of corrugated asbestos board. Against the side and bottom of the inner wall 3 are pieces 11 and 12, respectively, of the heavy uncorrugated board. The upper edge of the strip 11 is preferably turned outwardly so as to underlie the flange 6, as shown at 13.

The cover 2 has a downwardly extending flange 14 adapted to fit over the outer wall of the receptacle and is provided with heat-insulating material. The cover may have a metallic partition 15 between which and the outer wall are a plurality of layers of asbestos board 16, some or all of which are corrugated. Secured to the under side of the partition 14 is a circular piece of heavy felt 17. This may be held in place by cement or a disk 18 of sheet-metal may be secured to the outer wall of the cover by bolts 19 and serve to hold the felt 16 in place.

When a number of the utensils are to be used, they are preferably so constructed that they may be supported one on top of another, as shown in Fig. 1. Thus, the receptacle 20 is like receptacle 1 except that the bottom thereof is constructed much like the cover 2. A downwardly extending flange 21 is secured to the outer wall of the receptacle adapted to extend down over the outer wall 4 of the receptacle 1. Within this flange, a circular piece of heavy felt 22 is cemented to the bottom of the receptacle 20. Each receptacle and cover has handles 23 hinged to opposite sides thereof. A suitable stand 24 is preferably provided for supporting the receptacles.

In using the utensils, a food substance, when partially cooked, is placed in the receptacle 1, the latter being supported upon the stand 24, and the cover 2 is closed down over it. The asbestos serves to prevent radiation of the heat so that the substance remains at the cooking temperature and the cooking operation continues without further consumption of fuel. The dead-air cells within the walls of the receptacle and cover assist materially in preventing the heat from passing through the wall of the receptacle. When a second substance is to be similarly treated, the cover 2 is removed and the receptacle 20 is placed on top of the receptacle 1, the cover 2 being brought down over the top of the receptacle 20 after the substance has been placed therein. Further additions are similarly made as required.

It will be seen that the receptacles can be readily kept clean; if desired, the entire receptacle can be immersed in water as the latter cannot flow in about the asbestos. The construction here described is highly efficient in preventing the radiation of heat and possesses the further advantages of being convenient to handle and inexpensive to construct. The saving of fuel consumed in the cooking operation in using the utensil is apparent, as after the substance to be cooked has been raised to or somewhat above the cooking temperature, no further fuel is consumed, the substance being merely placed in one of the receptacles and radiation of heat therefrom being prevented.

Having now described our invention, what we claim as new therein and desire to secure by Letters Patent is as follows:—

1. A cooking utensil comprising a receptacle having an inner and an outer wall joined at their upper edges to provide an air-tight space between them, a layer of asbestos-board lying adjacent to each wall of the receptacle in said air-tight space and a plurality of layers of asbestos-board certain of which are corrugated filling the space between said first-named layers except for dead-air cells provided by said corrugations, and a cover adapted to fit over said receptacle having heat-insulating material secured thereto, substantially as set forth.

2. A cooking utensil comprising a receptacle having an inner and an outer wall one of which has a flange at the upper edge thereof secured to the edge of the other wall to provide an air-tight space between said walls, a layer of asbestos-board in said space adjacent to each of said walls and to said flange and a plurality of layers of asbestos-board certain of which are corrugated filling the space between said first-named layers except for dead-air cells provided by said corrugations, and a cover adapted to fit over said receptacle and having heat-insulating material secured thereto, substantially as set forth.

3. A cooking utensil comprising a receptacle having an inner and an outer wall joined at their upper edges to provide an air-tight space between them, a layer of asbestos-board lying adjacent to each wall of the receptacle in said air-tight space and a plurality of layers of asbestos-board certain of which are corrugated filling the space between said first-named layers except for dead-air cells provided by said corrugations, a second receptacle similarly constructed and having a downwardly extending portion of the bottom thereof adapted to fit over the walls of the first receptacle, and a cover for said second receptacle having heat-insulating material secured thereto, substantially as set forth.

This specification signed and witnessed this 23rd day of April, 1907.

ROBERT C. BLEAN.
FREDERICK B. CANODE.

Witnesses:
W. A. WATERBURY,
U. G. CASE.